United States Patent
Dupuis et al.

(10) Patent No.: US 7,689,204 B2
(45) Date of Patent: Mar. 30, 2010

(54) METHOD OF UNLOCKING A MOBILE TELEPHONE TYPE WIRELESS COMMUNICATION TERMINAL

(75) Inventors: Thierry Dupuis, Rueil (FR); Alain Guirauton, Argenteuil (FR)

(73) Assignee: IPG Electronics 504 Limited, St. Peter Port (GG)

(*) Notice: Subject to any disclaimer, the term of this patent is extended or adjusted under 35 U.S.C. 154(b) by 679 days.

(21) Appl. No.: 10/808,465

(22) Filed: Mar. 25, 2004

(65) Prior Publication Data

US 2004/0192388 A1    Sep. 30, 2004

(30) Foreign Application Priority Data

Mar. 26, 2003    (FR)    .................... 03 03690

(51) Int. Cl.
H04M 1/66    (2006.01)
H04M 3/00    (2006.01)

(52) U.S. Cl. .................. 455/411; 455/410; 455/418; 455/419

(58) Field of Classification Search ......... 455/410–411, 455/418, 419, 435.1, 414.1, 550.1, 551, 554.1, 455/554.2, 558, 26.1, 565; 340/5.1, 5.23, 340/5.2, 539.31, 542, 5.31; 379/168, 433.09
See application file for complete search history.

(56) References Cited

U.S. PATENT DOCUMENTS

| | | | | |
|---|---|---|---|---|
| 6,052,581 | A | * | 4/2000 | O'Connell et al. .......... 455/419 |
| 6,124,799 | A | * | 9/2000 | Parker ........................ 340/5.85 |
| 6,550,010 | B1 | * | 4/2003 | Link et al. ................... 713/168 |
| 6,577,857 | B1 | * | 6/2003 | Rodriguez ................... 455/405 |
| 6,829,492 | B2 | * | 12/2004 | Aerrabotu ................... 455/565 |

FOREIGN PATENT DOCUMENTS

| | | |
|---|---|---|
| EP | 1 061 755 A1 | 12/2000 |
| EP | 1 263 248 A1 | 12/2002 |
| WO | WO 98/57511 | * 12/1998 |
| WO | WO 98/57511 A1 | 12/1998 |

* cited by examiner

*Primary Examiner*—George Eng
*Assistant Examiner*—Nam Huynh
(74) *Attorney, Agent, or Firm*—Volpe and Koenig, P.C.

(57) ABSTRACT

In a method of unlocking mobile telephones, in particular one using the "SIM-LOCK" method, the user of the telephone submits an unlocking request directly to the manufacturer of the telephone and the manufacturer sends unlocking information to the telephone after verifying with the operator that the user is entitled to unlocking. This simplifies the administration of unlocking requests and makes it more reliable.

4 Claims, 1 Drawing Sheet

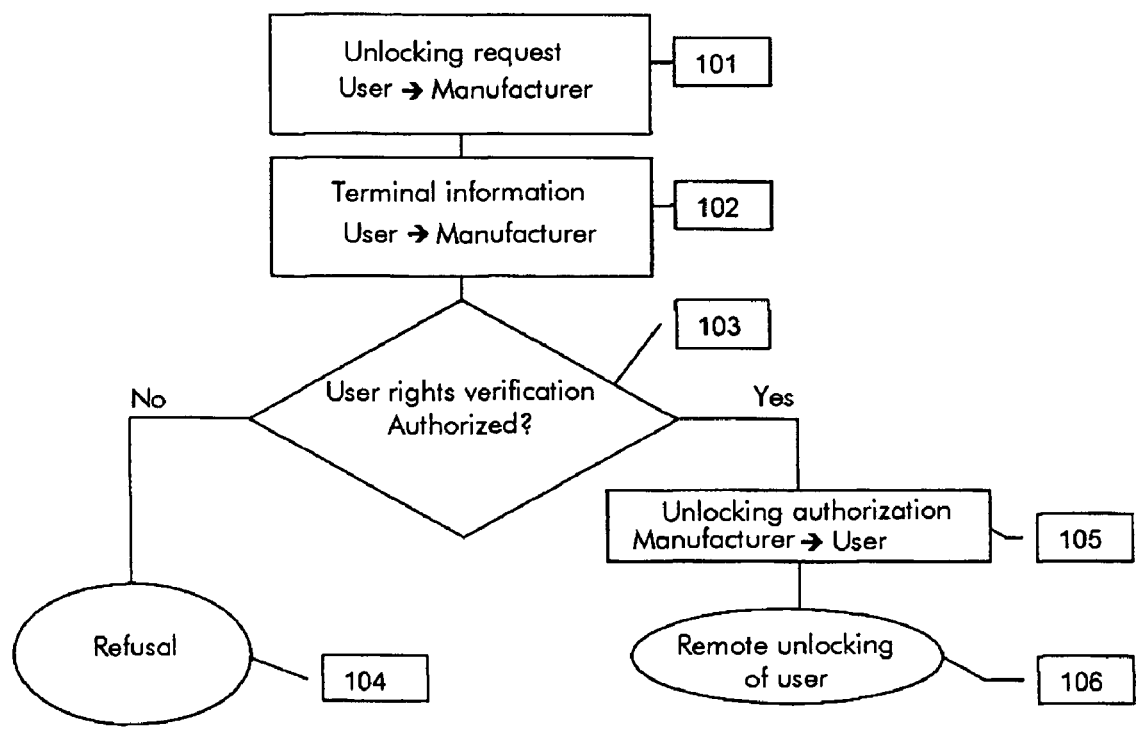

METHOD OF UNLOCKING A MOBILE TELEPHONE TYPE WIRELESS COMMUNICATION TERMINAL

CROSS-REFERENCE TO RELATED APPLICATIONS

This application is based on French Patent Application No. 03 03 690 filed Mar. 26, 2003, the disclosure of which is hereby incorporated by reference thereto in its entirety, and the priority of which is hereby claimed under 35 U.S.C. §119.

BACKGROUND OF THE INVENTION

1. Field of the Invention

The present invention relates to methods of unlocking mobile telephone type wireless telecommunication terminals.

The invention applies to any telecommunication terminal compatible with network technologies such as DECT, CDMA, WCDMA, GSM, UMTS, etc.

By mobile telecommunication terminal is meant any device associated with an integrated circuit card, also known as a microchip card, and conventionally referred to as a subscriber identity module ((SIM) or (U)SIM) card.

The invention relates more particularly to mobile telephone locking systems defined by the ETSI known as "SIM-LOCK" systems.

2. Description of the Prior Art

A locking system provides the following actions:

locking a mobile telephone to the services of a particular operator;

locking a mobile telephone to particular services of a given operator; and locking a mobile telephone to a given SIM card microchip, to prevent the use of the mobile telephone with a microchip card other than that with which the telephone was sold.

The locking system generally allows an operator to ensure that a customer who has purchased a telephone in the context of a promotion, whereby the telephone is sold at a very much reduced price on condition that the customer uses a particular subscription for a relatively long period, will comply with the terms of his agreement. This also solves other problems, for example the use of a stolen telephone with another microchip card.

It is nevertheless necessary to provide means for canceling such locking, for example at the end of an agreement.

A specific piece of information referred to hereinafter as the locking key is introduced into the telephone by the manufacturer during its manufacture, and problems with unlocking relate essentially to relations between the user of the telephone and the telephone operator, the standard practice being for a manufacturer to communicate a list of keys to an operator. The latter then carries out the unlocking at the request of the user, after verifying the latter's rights.

Transferring unlocking keys necessitates secure communication between manufacturers and operators.

As there is generally no exclusive agreement between them, each manufacturer supplies all operators, and vice-versa. Communication is not secure.

Furthermore, the number of telephone designs increases daily. There are therefore serious communication problems that lead to serious malfunctions and a very large number of complaints from users.

SUMMARY OF THE INVENTION

To solve the above problems, the invention proposes method of unlocking a mobile telephone wherein the user of the telephone submits an unlocking request to the manufacturer of the telephone and the manufacturer sends unlocking information to the telephone.

According to another feature of the invention, the manufacturer contacts the user's operator to verify that the user is entitled to unlocking.

According to another feature of the invention, the user sends the unlocking request to the manufacturer via the operator in a manner that is transparent to the operator.

According to another feature of the invention, the manufacturer sends the unlocking information to the telephone via the operator in a manner that is transparent to the operator.

According to another feature of the invention, the manufacturer sends the telephone a confirmation message containing indications of the operations effected.

According to another feature of the invention, the manufacturer sends the operator a confirmation message containing indications of the operations effected.

According to another feature of the invention, the message sent to the telephone and the message sent to the operator contain at least some different indications.

Information is advantageously exchanged between the terminal and the manufacturer via modulation means for transmitting data on the speech channel.

Transmitting digital data on the speech channel has the advantage of securing the transmission and of enabling a manufacturer to access all terminals even if their users have not subscribed to data transmission services.

BRIEF DESCRIPTION OF THE DRAWINGS

Other features and advantages of the invention will become clearly apparent in the course of the following description, which is given with reference to the appended drawing, which is a flowchart of the method of the invention.

DETAILED DESCRIPTION OF THE PREFERRED EMBODIMENT

In accordance with the invention, unlocking is performed by the telephone itself at the request of the user. To this end, the manufacturer sends specific information constituting an unlocking key to the telephone concerned.

Thus, according to the invention, a telephone manufacturer holds in a database the unlocking keys of all the telephones that it has manufactured, without communicating them to operators to whom it has shipped telephones.

However, the keys are associated in the database with means for identifying the corresponding telephones. For example, the serial number of the telephone may be used as unique characterizing information (International Mobile Equipment Identity-IMEI).

An operator may store in its own database the identification of a telephone supplied to a particular user, again with reference to its serial number, for example.

In a symmetrical manner, a user may easily identify his telephone, for example simply by reading the serial number indicated on the telephone.

According to the invention, a user who requires unlocking of his telephone communicates an unlocking request directly to the manufacturer of the telephone (step 101) together with the identification of the telephone concerned, for example its serial number (step 102).

This communication is transparent for the user's operator. The communication is effected by a telephone call using the telephone itself, for example by the user calling a telephone number indicated alongside the serial number or supplied by the operator at the time of submitting the request.

The manufacturer and the operator verify that the user is entitled to request unlocking (step 103), either manually by means of a telephone call or automatically by automated database look-up means. Note that in this step the operator does not have to consult lists of keys from various sources, but merely to verify its contractual relationship with a user in regard to a listed telephone. Verification is therefore much simpler and leads to a "yes" or a "no" response.

If the response is "no", unlocking is refused and the action terminates in a refusal (step 104).

If the response is "yes", the manufacturer communicates the unlocking instruction directly to the user (step 105).

This communication is also effected by any suitable means, i.e. usually by sending via the telephone network an unlocking code received by the telephone itself, which then proceeds to unlock itself.

Clearly this code is transmitted via the network managed by the operator, but once again the latter merely serves as a passive transmitter, for whom the operation is transparent.

In a variant of the invention, the manufacturer sends the code using a secure system provided in advance for preventing fraudulent unlocking by an unauthorized third party.

The telephone is then unlocked (step 106).

To minimize errors and complaints, the invention also proposes to send the user, and possibly the operator, a confirmation message containing a summary of the operations effected.

The message includes at least an indication of unlocking of the telephone, or where applicable of refusal of unlocking. It may also contain complementary information such as references, for example time references, of the unlocking request and the outcome thereof, and where applicable the reasons for refusal. Where appropriate, in order to preserve the confidentiality of some of the information transmitted, the message sent to the operator is different from that sent to the user.

The message may be sent by any means.

The data may advantageously be transmitted digitally on the speech channel using a data modulation device. The bit rate of the data and the carrier frequency of the modulation may be chosen so that the shape of the main lobe of the data modulation spectrum at the input of the speech coder is preserved on the output side of the speech coder and decoder.

Thus the bit rate is relatively low and there is no additional cost for data transmission as no specific subscription is required to transmit the data.

Another advantage of this solution is that it enables a manufacturer to obtain access to all its terminals, even if the user has not subscribed to data transmission services ("service data") or if his terminal is not compatible.

This solution does not rule out other solutions. A transmission medium such as the GPRS, for example, may be used.

The invention claimed is:

1. A method of unlocking a mobile terminal that is locked to services of a mobile services provider, pre-programmed with a telephone number corresponding to a manufacturer of the mobile terminal and pre-assigned an identification number corresponding to the mobile terminal, the method comprising:

the mobile terminal transmitting to the telephone number via the services of the mobile services provider an unlocking request including the identification number and requesting that the manufacturer transmit to the mobile terminal unlocking information that will enable the mobile terminal to unlock itself so that it is no longer locked to the services of the mobile services provider, the unlocking request being transparent to the mobile services provider;

the mobile terminal receiving the unlocking information from the manufacturer; and responsive to receiving the unlocking information from the manufacturer, the mobile terminal unlocking itself.

2. The method of claim 1, wherein the unlocking information is transmitted via the mobile services provider.

3. The method of claim 1, wherein the mobile terminal transmits the unlocking request to the telephone number and receives the unlocking information from the manufacturer on a speech channel.

4. The method of claim 1, further comprising the mobile terminal receiving and displaying a confirmation message from the manufacturer indicating that the unlocking request is either approved or denied.

* * * * *